(12) United States Patent
Meier

(10) Patent No.: US 6,489,886 B2
(45) Date of Patent: Dec. 3, 2002

(54) SECURITY SYSTEM TO PREVENT UNAUTHORIZED STARTING OF THE ENGINE OF A VEHICLE

(75) Inventor: Herbert Meier, Moosburg (DE)

(73) Assignee: Texas Instruments Deutschland, GmbH, Freising (DE)

( * ) Notice: Subject to any disclaimer, the term of this patent is extended or adjusted under 35 U.S.C. 154(b) by 0 days.

(21) Appl. No.: 09/835,927

(22) Filed: Apr. 17, 2001

(65) Prior Publication Data
US 2001/0035813 A1 Nov. 1, 2001

(30) Foreign Application Priority Data
Apr. 19, 2000 (DE) .......................................... 100 19 442

(51) Int. Cl.[7] ............................................... B60R 25/10
(52) U.S. Cl. ..................... 340/426; 340/425.5; 340/539
(58) Field of Search ............................. 340/425.5, 426, 340/438, 461, 468, 825.69, 825.72, 539; 180/287; 307/10.2, 10.3

(56) References Cited

U.S. PATENT DOCUMENTS 5,937,065 A * 8/1999 Simon, et al. ................. 380/9
6,169,943 B1 * 1/2001 Simon et al. ................ 340/901
6,191,703 B1 * 2/2001 Wallace .................. 340/825.69
6,323,566 B1 * 11/2001 Meier .......................... 340/539

FOREIGN PATENT DOCUMENTS

DE           43 29 697 A1  *  3/1995

* cited by examiner

Primary Examiner—Van Trieu
(74) Attorney, Agent, or Firm—William B. Kempler; W. James Brady; Frederick J. Telecky, Jr.

(57) ABSTRACT

A security system to prevent unauthorized starting of the engine of a vehicle has a remote control unit (18) equipped with a transponder which, on reception of an interrogation signal using at least one reception aerial (20), transmits an identification code group using a transmitter unit (40). Located in the vehicle is a control unit (12), which on actuation of a starter button (26) within the vehicle, transmits the interrogation signal, and subsequently checks the identification code group transmitted by the remote control unit. Starting of the engine will only be possible when the identification code group coincides with the code group expected by it. Connected to the reception aerial (20) is a signal detector (28), which has a reaction threshold level that can be toggled between a high value and a low value. This signal detector will relay the interrogation signal to further processing stages only when the interrogation signal level exceeds the set reaction threshold.

8 Claims, 2 Drawing Sheets

SECURITY SYSTEM TO PREVENT UNAUTHORIZED STARTING OF THE ENGINE OF A VEHICLE

BACKGROUND OF THE INVENTION

The invention relates to a security system to prevent unauthorized starting of the engine of a vehicle, with a remote control unit containing a transponder which, on reception of an interrogation signal by means of at least one reception aerial, transmits an identification code group by means of a transmitter unit, and a control unit located in the vehicle which, on actuation of a starter button within the vehicle, transmits the interrogation signal, and which subsequently checks the identification code group transmitted by the remote control unit and enables the starting procedure of the engine only when the identification code group coincides with the code group expected by it.

Modern motor vehicles are equipped with electronic security systems that prevent unauthorised persons from opening the motor vehicle and starting the engine. In order to open the vehicle and to start the engine, authorised persons must carry a remote control unit in which is stored an identification code group which is transmitted by the remote control unit and which can be checked by a control unit within the vehicle, whereby the control unit in the vehicle will allow access to the vehicle only when this identification code group coincides with the code group expected by it.

Such a security system, by means of which only authorised persons are allowed access to the vehicle, is described in patent application DE 100 12 637.5.

In the case of this security system, the control unit in the vehicle transmits an interrogation signal as soon as the person wanting access to the vehicle touches the door handle. The remote control unit, which is carried by the person and which may be located, for example, in the car key, in a key tag or even in a so-called chip card, receives this interrogation signal and subsequently re-transmits the identification code group to the control unit within the vehicle. The control unit then checks this code group for coincidence with the code group expected by it and, on positive verification of coincidence, allows access to the vehicle. The person who touched the door handle can therefore operate the door handle as if the vehicle had not been locked. This is because the interchange of signals between the control unit and the remote control unit takes place in such a short time that no delay is felt during the mechanical opening process of the vehicle. This security system can be complemented by a further security system, or it can be combined with an already existing security system, which only allows the engine to be started after the execution of an individual verification process and positive confirmation. Such an enhanced security system is especially advantageous when the engine is not started by introducing an ignition key into a specifically provided ignition lock, but simply by pressing a starter button. Without the provision of additional security measures against unauthorised starting of the engine of a vehicle equipped in this way, dangerous situations may easily, arise. Assuming that an authorised person has opened the vehicle door, the engine could be started by pressing the starter button without any further security check taking place. If, for example, a child, being in the vehicle after the door has been opened, pressed the starter button, then the engine would start whilst the person intending to carry out the starting process is not yet in the vehicle. The vehicle could thus move off and cause a dangerous situation.

SUMMARY OF THE INVENTION

The invention therefore rests on the requirement of creating a security system of the type described above, whereby any unauthorised starting of the engine is prevented, even if the vehicle has been opened by an authorised person after completion of a first security check.

With a security system of the type described above, this objective is achieved by a signal detector, connected to the reception aerial, whose reaction threshold can be toggled between a high and a low value, and which relays the interrogation signal for further evaluation only when the interrogation signal level exceeds the set reaction threshold, a code verification circuit, connected to the signal detector, which checks the interrogation signal relayed by it as to whether it contains a pre-established code group and, on recognition of this code group, switches the reaction threshold of the signal detector to its high value, whereby the code verification circuit will cause the transmitter unit to transmit the identification code group only when it receives the interrogation signal, even after the signal detector has switched over to its high reaction threshold level.

The security system according to the invention not only checks whether the person who pressed the starter button of the vehicle is authorised to start the engine of the corresponding vehicle, but even before this check, it has already verified whether this person is inside the vehicle and in the area of the driving seat. By increasing the reaction threshold level of the signal detector after reception of the interrogation signal at a low reaction threshold level, it can be positively asserted that the person carrying the remote control unit is in the immediate proximity of the starter button, that is in the interior of the vehicle, when the signal is still received even at the high reaction threshold level. This makes it impossible for the dangerous situation to arise where the engine is started by a person inside the vehicle whilst the person carrying the remote control unit is still outside the vehicle.

In an advantageous embodiment, the security system according to the invention comprises two further reception aerials which are spatially arranged in such a way that the main direction of reception of each of the three reception aerials is aligned to a different one of each of the three mutually perpendicular spatial axes, and that each of the two further reception aerials is connected to a signal detector of the same type as the one connected to the first reception aerial. Because of the use of a total of three reception aerials, a very good spatial acquisition of the electromagnetic field originated by the interrogation signal is achieved, which improves on the certainty of the assertion that the person carrying the remote control unit is, in fact, inside the vehicle and actually in the driving seat.

It is furthermore advantageous to provide for the reaction threshold levels of the signal detectors to be adjustable in accordance with the spatial conditions of the intended application field of the remote control unit. This setting of the reaction threshold levels is carried out once during the production process of the remote control unit, to suit the conditions in the vehicle to which the remote control unit will be assigned. This refinement also contributes to improving the certainty of locating the position of the person carrying the remote control unit.

BRIEF DESCRIPTION OF THE DRAWINGS

An exemplified embodiment of the invention shall now be explained in more detail with reference to the attached drawing, where.

DETAILED DESCRIPTION OF THE DRAWINGS

Figure 1:
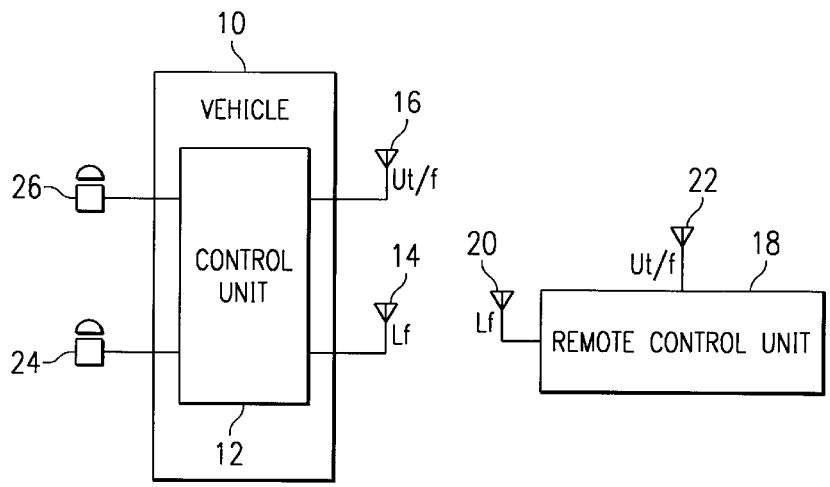
FIG. 1 is a schematic view illustrating, the general application principle of the security system according to the invention.

The vehicle 10 represented in block form in FIG. 1 shall be fitted out in such a way that only authorised persons shall be allowed access to the vehicle, that is to be allowed to open the door. The vehicle 10 contains a control unit 12 from which all checking, transmission and reception functions are carried out, containing for this purpose two aerials, that is one LF transmitting aerial 14 and one UHF reception aerial 16.

Assigned to the vehicle 10 is a remote control unit 18, which is normally carried by the authorised person and which also has two aerials, that is one LF reception aerial 20 and one UHF transmitting aerial 22. The remote control unit 18 can generate an identification code group which is unequivocally assigned to the vehicle 10 and its control unit 12, so that only one person, the one carrying this remote control unit 18, can gain access to the vehicle.

By actuating the switch 24, symbolically represented as a push button, the control unit 12 can be made to transmit an interrogation signal via the LF transmitting aerial 14. The switch 24 is preferentially connected to the door handle of the vehicle, so that it will be actuated automatically when the door handle is touched and moved. The interrogation signal transmitted by the control unit is received by the remote control unit 18, which is carried by the person actuating the door handle. Reception of the interrogation signal causes the remote control unit 18 to generate and transmit, via the UHF transmitting aerial, an identification code group which is received by the UHF reception aerial 16 of the control unit 12. If this code group coincides with a code group expected by the control unit 12, the control unit causes the door to unlock, so that the person gripping the door handle will also be able to open the vehicle door.

The existence of this security system is not an absolute precondition for the security system for the prevention of unauthorised starting of the engine of a vehicle, to be described in the following, since the latter can also be used when the authorised person has opened the door of the vehicle in the conventional way by means of a key, without a code check having taken place. The security system to be described in the following, however, complements the system mentioned above in an advantageous way, so that it will now be described as operating in conjunction with the access security system.

Figure 2:
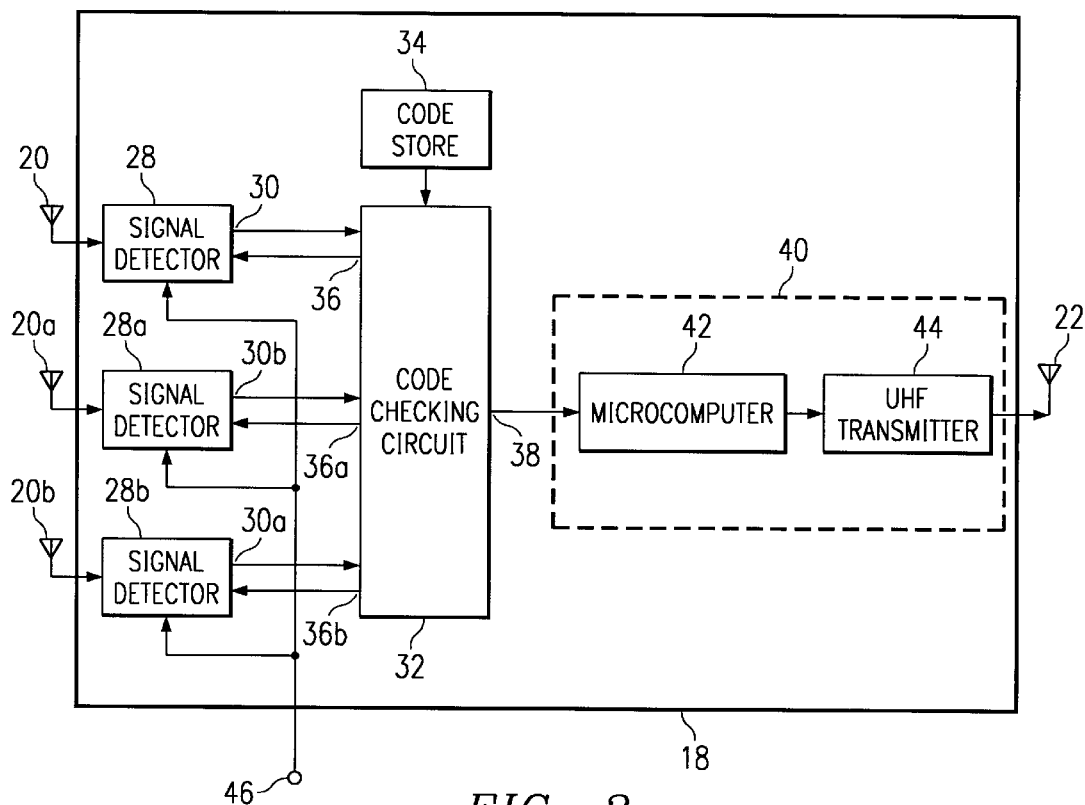
FIG. 2 is a block diagram of the remote control unit used in the security system.

Making reference to FIG. 2, a situation shall initially be described where an authorised person has opened the vehicle door, is sitting in the driving seat and actuates the starter button of the engine. FIG. 1 shows this starter button 26 schematically in conjunction with the control unit 12.

Actuation of the starter button 26 causes the control unit 12 to transmit an interrogation signal via the LF transmitting aerial 14, which is received at the reception aerial 20. The reception aerial 20 then feeds the interrogation signal to a signal detector 28. The signal detector 28 has two reaction threshold levels, that is one low reaction threshold level and one high reaction threshold level. When the control unit 12 in the vehicle 10 has transmitted the interrogation signal, then, because of the short distance between the LF transmitting aerial 14 and the reception aerial 20, it is certain that it will be received by the remote control unit 18 at such a high field strength that the low reaction threshold level of the signal detector 28 will be exceeded. The signal detector, therefore, relays the interrogation signal received, or a signal derived from it, from its output 30 to a code checking circuit 32. This code checking circuit 32 checks a code group, added by the control circuit 12 to the interrogation signal as a result of the actuation of the switch 26, as to whether it coincides with a code group stored in a code store 34. Since it is assumed in the present case that the authorised person is now sitting in the driving seat and has pressed the starter button, this code group check gives a positive result, causing the code checking circuit 32 to output a signal at its output 36 which puts the reaction threshold of the signal detector 28 into its high level state. In the present case, and because of the short distance between the remote control unit 18 and the LF transmitting aerial 14, the field strength generated by the interrogation signal is sufficiently high to exceed this high reaction threshold level in the signal detector 28, so that the interrogation signal, or the signal derived from it, will still reach the code checking circuit 32. The code checking circuit 32 recognises this and outputs at its output 38 a wake-up signal to a microcomputer 42, contained in a transmitter unit 40, which switches this from a current-saving quiescent state into an active state, thereby causing a UHF transmitter 44 in the transmitter unit 40 to transmit via the UHF transmitting aerial 22 an identification code group, unambiguously assigned to the vehicle 10. This code group is received by the control unit 12 in the vehicle 10 via the UHF reception aerial 16 and thereupon enables the starting of the engine, because the checking procedure of the identification code group in the control unit 12 has, in the assumed case, yielded a positive result.

In the case where an unauthorised person, carrying a remote control unit not assigned to the vehicle 10, has taken the driving seat and has actuated the starter button, the control unit 12 would have recognised the identification code group received as incorrect and, in consequence, starting of the engine would not have been possible.

A situation shall now be considered where a person definitely authorised to start the engine of the vehicle has opened the vehicle door and is therefore at a relatively short distance from the LF transmitting aerial 14, but where this person is not yet sitting in the driving seat but remains standing outside the vehicle. Without the security system here to be described it would, for example, be possible for a child within the vehicle to press the starter button, thus causing the engine to start. How this can be prevented shall by explained in the following.

As in the case previously described, pressing the starter button 26 causes the control unit 12 to transmit the interrogation signal via the LF transmitting aerial 14. This interrogation signal is received by the reception aerial 20 of the remote control unit 18 and evaluated by the signal detector 28. Since the signal detector 28 will, initially, be in the low reaction threshold level state, the reception field strength at the location of the remote control unit 18 will be sufficient to exceed this threshold level, thus causing the signal detector 28 to relay the interrogation signal, or the signal derived from it, from its output 30 to the code checking circuit 32. By checking the code group contained in this signal it will be confirmed that the starter button 26 has been actuated, so that subsequently the code checking circuit, via the signal at its output 36, switches the reaction threshold in the signal detector 28 to its high level. Since, however, the person carrying the remote control unit 18 is not in the vehicle, but outside the vehicle, the field strength, generated by the interrogation signal, at the location of the remote control unit 18 will, in this case, not be sufficient to exceed the high reaction threshold level of the signal detector 28 as well, thus causing the signal transmission from the output 30 to the code checking circuit to cease. This will be detected by the code checking circuit 32, so that no wake-up signal will be transmitted from its output 38 to the microcomputer 42 in the transmitter unit 40. There will, therefore, be no transmission of the identification code group via the UHF aerial 22. As a consequence, the control unit 12 in the vehicle 10 receives no reply from the remote control unit 18, and therefore does not enable the starter of the engine. Pressing the starter button 26 will, therefore, have no effect.

Since in this case the code checking circuit 32 does not deliver a wake-up signal at its output 38, the transmitter unit 40, together with the units contained in it, remains in its current-saving quiescent state, thus preventing any unnecessary current consumption, which has a beneficial effect on the useful life of the battery in the remote control unit 18.

As can be seen in FIG. 2, the remote control unit 18 not only contains the reception aerial 20, but two further reception aerials 20a and 20b. Also provided are two further signal detectors 28a and 28b, which in each case are interposed between the corresponding further aerial and the code checking circuit 32, in the same way as the signal detector 28. The additional reception aerials 20a and 20b make it possible to adapt the remote control unit 18 to the spatial reception conditions and, in particular, to the field strength distribution inside the motor vehicle. The aerials 20, 20a and 20b are disposed at the remote control unit in such a way that their main directions of reception are aligned in three different spatial axes, which are perpendicular to each other. In this manner, even under very unfavourable conditions, at least one of the aerials will always be able to receive the interrogation signal at a sufficiently high field strength to ensure its reliable evaluation and further processing. The signal detectors 28, 28a and 28b are connected in parallel to the code checking circuit 32, which makes sure that only the first signal reaching it from one of the outputs 30, 30a, 30b is made available for subsequent processing.

To further improve the reception behaviour, not only can the individual reaction threshold levels of the signal detectors 28, 28a, 28b be adjusted via a setting input 46, but it is also possible to optimise each of the aerial resonant circuits of the reception aerials 20, 20a and 20b by tuning their resonant capacitance to their respective nominal values.

Figure 3:
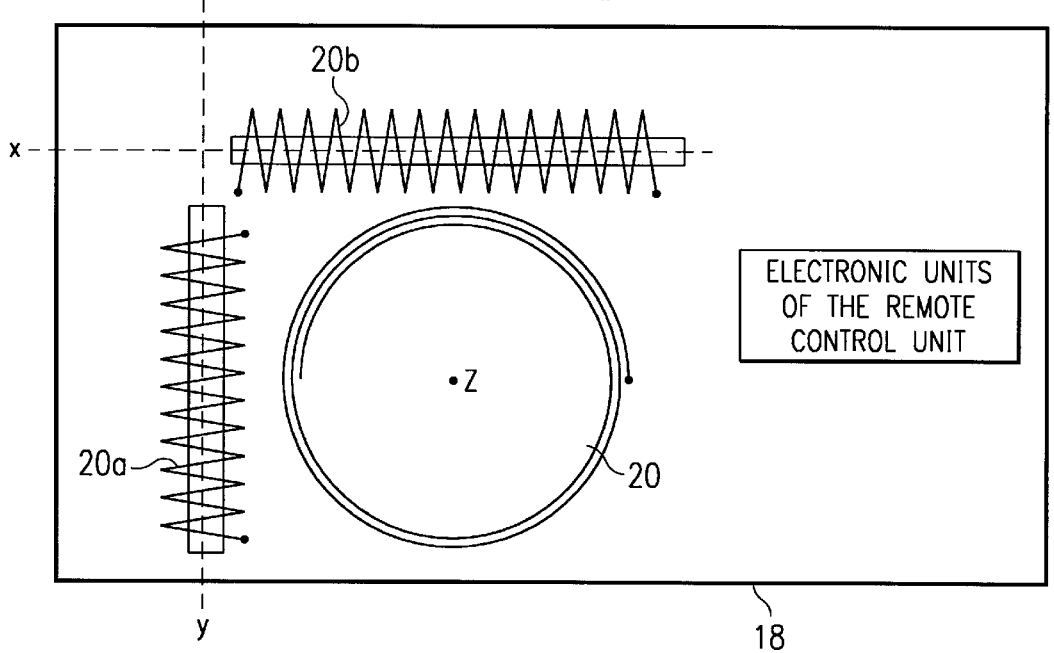
FIG. 3 is a schematic representation of the remote control unit with three reception aerials arranged on it.

FIG. 3 shows in schematic form how the three aerials 20, 20a and 20b can be arranged on a remote control unit 18, embodied as a chip card, in order to achieve the desired alignment for reception in the three mutually perpendicular main spatial axes. As can be seen, the two aerials 20 and 20a are embodied as ferrite aerials which are arranged on the chip card in line with the axes denoted x and y, which are perpendicular to each other. The third aerial, the aerial 20b is embodied as an air coil whose turns are in a plane with that of the chip card. The main reception directions of the corresponding aerials are therefore in the direction of line x (aerial 20), in the direction of line y (aerial 20a), and in the direction indicated by the point z perpendicular to the plane of the figure (aerial 20b). Due to this arrangement of the three reception aerials, the interrogation signal is received in practice at a sufficiently high field strength by at least one of the aerials, whatever the position of the remote control unit 18, to enable its evaluation by the code checking circuit 32.

What is claimed is:

1. A security system to prevent unauthorized operation of a vehicle comprising:
   a vehicle control unit comprising a transmitter and a receiver and being responsive to a control signal to transmit an interrogation signal;
   a remote transponder comprising a receiver for receiving the interrogation signal and for generating a DC voltage to operate the transponder and a coded signal therefrom, a signal strength detector having a plurality of threshold levels receiving the coded signal and a code checking circuit receiving an output of the signal strength detector to determine if a code in the coded signal matches a stored code, the code checking circuit, on determining a match, changing the threshold level of the signal strength detector from a first to a second level which permits only signals of a predetermined strength to be received, whereby the predetermined signal strength is indicative of the transponder being at a chosen location within the vehicle; and
   a transmitter in the transponder transmitting an authorization signal to the vehicle control unit to authorize the operation of the vehicle if a properly coded interrogation signal is received at the second threshold level.

2. Security system of claim 1 wherein the receiver has three antennas for receiving the interrogation signal, the antennas being spatially arranged so that each has a main reception direction along one of three mutually perpendicular axes, each said antenna being coupled to a separate signal strength detector.

3. Security system of claim 1 wherein the control signal is generated by closing a switch.

4. Security system of claim 2 wherein the control signal is generated by closing a switch.

5. In a security system for a vehicle having a control unit in the vehicle and a transponder, the improvement comprising:
   a signal strength detector having a plurality of threshold levels, a properly coded signal received at a first threshold level operative to change the threshold level to a second threshold level, the second threshold level being indicative of the transponder being at a chosen location within the vehicle.

6. Security system of claim 3 wherein the receiver has three antennas for receiving the interrogation signal, the antennas being spatially arranged so that each has a main reception direction along one of three mutually perpendicular axes, each said antenna being coupled to a separate signal strength detector.

7. Security system of claim 6 wherein the control signal is generated by closing a switch.

8. Security system of claim 5 wherein the control signal is generated by closing a switch.

* * * * *